(12) United States Patent
Sugita et al.

(10) Patent No.: US 7,242,117 B2
(45) Date of Patent: Jul. 10, 2007

(54) LINEAR MOTOR

(75) Inventors: Satoshi Sugita, Nagano (JP); Yasushi Misawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 112 days.

(21) Appl. No.: 11/287,066

(22) Filed: Nov. 25, 2005

(65) Prior Publication Data

US 2006/0108879 A1    May 25, 2006

(30) Foreign Application Priority Data

Nov. 25, 2004 (JP) .............................. 2004-340932

(51) Int. Cl.
H20K 41/00 (2006.01)

(52) U.S. Cl. ........................... 310/12; 310/13; 310/15; 310/17

(58) Field of Classification Search .................. 310/12, 310/13, 15
See application file for complete search history.

(56) References Cited

U.S. PATENT DOCUMENTS

| | | | |
|---|---|---|---|
| 4,705,971 A | | 11/1987 | Nagasaka |
| 5,218,250 A | | 6/1993 | Nakagawa |
| 6,661,124 B1 | * | 12/2003 | Seki et al. ..................... 310/12 |
| 6,661,125 B2 | * | 12/2003 | Itoh et al. ..................... 310/12 |
| 6,879,066 B2 | * | 4/2005 | Hashimoto et al. ........... 310/12 |
| 6,891,285 B2 | * | 5/2005 | Harned et al. ................. 310/12 |
| 6,949,846 B2 | * | 9/2005 | Sugita et al. .................. 310/12 |
| 6,960,846 B2 | * | 11/2005 | Uchida ......................... 310/12 |
| 6,960,858 B2 | * | 11/2005 | Kawai ......................... 310/181 |

FOREIGN PATENT DOCUMENTS

JP          2001-119919          4/2001

* cited by examiner

Primary Examiner—Darren Schuberg
Assistant Examiner—Iraj Mohandesdi
(74) Attorney, Agent, or Firm—Rankin, Hill, Porter & Clark LLP

(57) ABSTRACT

There is provided a linear motor in which the number of armature windings can be reduced, and an armature iron core can be readily fixed to a member for supporting the armature iron core.

Each of three inductors 1A to 1C is so arranged that a tooth row 7 therein is located on each side thereof in a width direction thereof orthogonal to a moving direction of an armature 3. The three inductors are arranged spaced apart from each other by a predetermined spacing in the width direction. An armature iron core 9 of the armature 3 includes four magnetic pole portions 15A to 15D and three yoke portions 17A to 17, and is constituted by a plurality of electromagnetic steel plates laminated in the moving direction of the armature 3. The four magnetic pole portions 15A to 15D are arranged in parallel and spaced apart from each other by a predetermined spacing so that each of the three inductors 1A to 1C is positioned within the spacing. Each of permanent magnet rows 11A to 11F is arranged on an opposed surface 21 of each magnetic pole portion. The three yoke portions 17A to 17C extend in the moving direction of the armature 3 and magnetically couples the adjacent two magnetic pole portions 15A and 15B, 15B and 15C, and 15C and 15D, respectively. Three armature windings 13A to 13C are wound around the yoke portions 17A to 17C, respectively.

7 Claims, 11 Drawing Sheets

LINEAR MOTOR

BACKGROUND OF THE INVENTION

The present invention relates to a linear motor.

Japanese Patent Application Laid-Open Publication No. 119919/2001 (Patent Document 1) discloses a linear motor including a stator constituted by a pair of inductors and a moving element constituted by an armature. The pair of inductors is formed of a magnetic material. Each pair of inductors includes a tooth row constituted by a plurality of teeth provided at a predetermined pitch τ in a moving direction of the moving element. The armature includes an armature iron core, at least one permanent magnet row, and a plurality of armature windings. The armature iron core includes at least one opposed surface facing the tooth row and is constituted by a plurality of steel plates laminated in a direction orthogonal to the moving direction of the moving element. The permanent magnet row is constituted by a plurality of permanent magnets. The permanent magnets are provided on the opposed surface at a pitch τ/2 in the moving direction of the moving element and are so arranged that different polarities alternately appear along the opposed surface. The armature windings are wound around the armature iron core and are arranged side by side in the moving direction of the moving element.

In the conventional linear motor, however, the armature windings are arranged side by side in the moving direction of the moving element. Thus, a lot of armature windings (18 windings in the case of the linear motor disclosed in the Patent Document 1) become necessary. Further, the steel plates are laminated in the direction orthogonal to the moving direction of the moving element, thereby constituting the armature iron core. Accordingly, the armature iron core and a member for supporting the armature iron core must be secured by screws and the like that pass through the steel plates. Manufacture of the linear motor is thereby complicated and requires much time and effort.

SUMMARY OF THE INVENTION

An object of the present invention is therefore to provide a linear motor that can reduce the number of armature windings therein.

Other object of the present invention is to provide a linear motor in which an armature iron core and a member for supporting the armature iron core can be readily fixed.

A linear motor, improvement of which is aimed at by the present invention comprises a moving element and a stator. The linear motor includes at least two inductors formed of a magnetic material and an armature. Each of at least two inductors has a tooth row at each of both sides in a width direction orthogonal to a moving direction of a moving element. The tooth row is constituted by a plurality of teeth provided at a predetermined pitch τ1 in the moving direction of the moving element. At least two inductors are arranged in parallel by a predetermined spacing in a width direction.

The armature includes an iron core, at least two armature windings, and at least four permanent magnet rows. The at least four permanent magnet rows has a plurality of permanent magnets provided at a predetermined pitch τ2 in the moving direction and arranged so that different polarities alternately appear in the moving direction. The armature iron core has at least three magnetic pole portions and at least two yoke portions each for magnetically coupling adjacent two of at least three magnetic pole portions. The at least three magnetic pole portions are spaced apart from each other in parallel by a predetermined spacing so that each of the inductors is positioned within each of the spacings. Each of the at least three magnetic pole portions have one or two opposed surfaces opposing said tooth row of the inductors. Each of the at least four permanent magnet rows are provided on each of the opposed surfaces. The at least two armature windings are wound around the at least three magnetic pole portions or the at least two yoke portions so that magnetic flux is generated between the plurality of permanent magnets forming the permanent magnetic pole row and the tooth row opposing the permanent magnet pole row.

In a linear motor according to this invention, either of at least two inductors or an armature is used as a moving element, and the other of at least two inductors or an armature is used as a stator.

With the above construction of this invention, the number of armature windings can be advantageously reduced.

Thus, in a linear motor according to this invention, at least two yoke portions are arranged side by side in the direction orthogonal to the moving direction of the moving element or in the width direction of the inductors. Accordingly when the armature windings are wound around at least three magnetic pole portions or at least two yoke portions, at least two armature windings can be wound in a direction extending in a moving direction of the moving element. Also the at least two yoke portions can be located in parallel in a direction orthogonal to the moving direction of the moving element or in a width direction of the inductors. For this reason, by adjusting the size of each armature winding, the number of the armature windings can be reduced.

Further, the cross-sections of the armature iron core in the directions orthogonal to the moving direction of the moving element can be made to have an identical shape. Accordingly, the armature iron core can be constituted by a plurality of electromagnetic steel plates laminated in the moving direction of the moving element. For this reason, in the armature iron core, fitting members for fixing the armature iron core to an iron core supporting member such as a movable stage can be formed. When one of fitting concave portions and fitting convex portions are formed in the armature iron core and the other of the fitting concave portions and the fitting convex portions are formed in the iron core supporting member, for example, the one of the fitting concave portions and the fitting convex portions can be fitted into the other of the fitting concave portions and the fitting convex portions. The armature iron core can be thereby fixed to the iron core supporting member. For this reason, without using screws or the like as in a conventional manner, the armature iron core can be readily fixed to the armature supporting member.

Preferably, the pitch τ2 for the permanent magnets of the permanent magnet rows is half of the pitch τ1 for the teeth of the inductors. With this arrangement, magnetic fluxes caused by the armature windings and the permanent magnets, which are generated from the surfaces of the permanent magnet rows to the tooth rows of the inductors, can be most effectively developed into thrust force in the moving direction. Further, when the pitches τ1 and τ2 are set to satisfy an equation τ2=τ1/2±τ1/(n/m) wherein indicates the total number of the permanent magnets arranged in the moving direction, and m indicates the number of phases, cogging forces caused by attraction between the permanent magnets and the tooth rows of the inductors are canceled out. Accordingly, a reduction in the thrust force can be minimized and the cogging forces can be reduced.

Preferably, the permanent magnets constituting each of the permanent magnet rows facing the corresponding one of the tooth rows are skewed with respect to the teeth constituting the corresponding one of the tooth rows. With this arrangement, a reduction in the thrust force can be minimized and the cogging forces can be reduced. In this case, when the permanent magnets constituting two of the permanent magnet rows provided at each of the three or more magnetic pole portions are skewed in the same direction, magnetic saturation of the electromagnetic steel plates constituting the magnetic pole portions can be prevented.

Preferably, at least one permanent magnet mounting portion is formed on each of the three or more magnetic pole portions. The at least one permanent magnet mounting portion is so configured to come into contact with at least two external surfaces of each of the permanent magnet rows. With this arrangement, just by forming the magnetic pole portions into an appropriate shape, the permanent magnets can be securely fixed to the magnetic pole portions. The magnetic saturation of the electromagnetic steel plates that constitute the magnetic pole portions can also be prevented. When only one external surface of each permanent magnet row is brought into contact with the corresponding one of the three or more magnetic pole portion, a gap is formed between the permanent magnet row and the magnetic pole portion. The magnetic flux inside the magnetic pole portions adjacent to this gap is therefore difficult to flow due to this gap. The magnetic saturation thereby tends to occur.

A specific linear motor according to the present invention includes three inductors arranged in parallel and spaced apart from each other at a predetermined spacing in a width direction of each of the three inductors orthogonal to a moving direction of a moving element. Each of the three inductors has a tooth row on each side thereof in the width direction. An armature iron core includes four magnetic pole portions arranged in parallel and spaced apart from each other by a predetermined spacing so that each of the three inductors is positioned within the spacing; and three yoke portions each for magnetically coupling the adjacent two of the four magnetic pole portions. Each of the four magnetic pole portions has at least one opposed surface. Each of the permanent magnet rows is arranged on the at least one opposed surface of each of the four magnetic pole portions. Each of three armature windings for generating a magnetic flux is wound around each of the three yoke portions for magnetically coupling the four magnetic pole portions. Then, the armature iron core is constituted by a plurality of electromagnetic steel plates laminated in the moving direction. In this linear motor, by making the three armature windings the armature windings of a U phase, a V phase, and a W phase, a three-phase motor can be constituted.

In this case, various conditions can be used for indicating positional relationship, which is geometrical phase difference in terms of electrical angle, of two tooth rows, at least two inductors, and two permanent magnet rows. Incidentally, geometrical phase difference in terms of the electrical angle herein refers to an amount of difference, between two in a geometrical structure, indicated in terms of electrical angle. For example, an amount of difference includes the differences between one tooth row and the other tooth row, one inductor and the other inductors, and one permanent magnet row and the other permanent magnet row. The electrical angle used herein is so defined that a plurality of teeth of each inductor spaced apart from each other at a pitch τ is to be 360 degrees.

In an embodiment of a linear motor, a geometrical phase difference between two tooth rows provided at each of the three inductors in terms of electrical angle can be set to zero degrees. With this arrangement, two tooth rows provided at an inductor are arranged at a same position in a width direction orthogonal to a moving direction of a moving element. If one of the adjacent two inductors is shifted in the moving direction, geometrical phase difference among inductors in terms of electrical angle is set to be 120 degrees. Accordingly the three inductors are not arranged at a same position in the width direction orthogonal to the moving direction of the moving element. And the two adjacent inductors are arranged with difference of 120 degrees in terms of electrical angle. If geometrical phase difference in terms of electrical angle, or positional relationship, between two permanent magnet rows opposing the two tooth rows of one inductor is set to zero degrees, the two permanent magnetic pole rows are arranged at a same position in the width direction orthogonal to the moving direction of the moving element. With this arrangement, magnetic saturation of the armature iron core can be made difficult to occur.

Alternatively, a geometrical phase difference between two tooth rows provided at each of the three inductors in terms of electrical angle can be set to zero degrees, a geometrical phase difference among the three inductors in terms of electrical angle can be set to zero degrees, and a geometrical phase difference between two permanent magnet rows provided corresponding to one of the three inductors and two of the permanent magnet rows provided corresponding to other one of the three inductors adjacent to the one of the three inductors in terms of electrical angle can be set to be 120 degrees. With this arrangement, since the geometrical phase difference between the two tooth rows of each of the three inductors in terms of electrical angle is zero degrees and the geometrical phase difference among the three inductors in terms of electrical angle is zero degrees, the three inductors can be installed with the tooth rows thereof aligned to one another. For this reason, installation of the three inductors is facilitated.

In another embodiment of a linear motor, a geometrical phase difference between two tooth rows provided at each of the three inductors in terms of electrical angle can be set to be 120 degrees, a geometrical phase difference among the three inductors in terms of electrical angle can be set to zero degrees, a geometrical phase difference between two permanent magnet rows facing the two tooth rows of each of the three inductors in terms of electrical angle is set to be 120 degrees, and a geometrical phase difference between two permanent magnet rows provided at each of the magnetic pole portions in terms of electrical angle can be set to zero degrees. With this arrangement, since the geometrical phase difference among the three inductors in terms of electrical angle is zero degrees, the three inductors can be installed by aligning the tooth rows thereof to one another. For this reason, installation of the inductors is facilitated. Further, the magnetic saturation of the armature iron core can be also made difficult to occur.

Other specific linear motor according to the present invention includes two inductors arranged in parallel and spaced apart from each other by a predetermined spacing in a width direction of each of the two inductors orthogonal to a moving direction of a moving element. Each of the two inductors includes a tooth row on each side thereof in the width direction. Two inductors are magnetically coupled. An armature iron core includes three magnetic pole portions arranged in parallel and spaced apart from each other by a predetermined spacing so that each of the two inductors is positioned within the spacing; and two yoke portions for magnetically coupling the three magnetic pole portions adjacent to one another. Each of the three magnetic pole portions has at least one opposed surface. A permanent magnet row is arranged on the at least one opposed surface of each of the three magnetic pole portions, and each of three armature windings for generating a magnetic flux is wound around each of the three magnetic pole portions. A geometrical phase difference between two tooth rows provided at each of the two inductors in terms of electrical angle is 120 degrees. A geometrical phase difference between the two inductors in terms of electrical angle is zero degrees. A geometrical phase difference between two permanent magnet rows facing the two tooth rows provided at each of the two inductors in terms of electrical angle is 120 degrees. The armature iron core is constituted by a plurality of electromagnetic steel plates laminated in the moving direction.

In this linear motor, one magnetic circuit is formed by the armature winding wound around the magnetic pole portion at one end of the three magnetic pole portions and the armature winding wound around the magnetic pole portion of the middle of the three magnetic pole portions. Further, another magnetic circuit is formed by the armature winding wound around the magnetic pole portion at the other end of the three magnetic pole portions and the armature winding wound around the magnetic pole portion in the middle. A two-phase magnetic circuit is thereby formed. Though the magnetic circuit is the two-phase magnetic circuit, the phase of the armature winding in the middle is obtained by synthesis of the phases of two magnetic circuits. The armature windings are thereby of three phases. For this reason, the number of the inductors can be made two, and a driving force as a three-phase motor can be obtained, besides achieving downsizing of the linear motor. Further, since the geometrical phase difference between the two tooth rows in terms of electrical angle is 120 degrees, the magnetic saturation of the magnetic pole portion in the middle can be prevented. Since the geometrical phase difference between the two inductors in terms of electrical angle is zero degrees, the two inductors can be installed by aligning the ends of the toot rows thereof to one another. For this reason, installation of the inductors is facilitated.

Other specific linear motor according to the present invention includes two inductors arranged in parallel and spaced apart from each other by a predetermined spacing in a width direction of each of the two inductors orthogonal to a moving direction of a moving element. Each of the two inductors includes a tooth row on each side thereof in the width direction. An armature iron core includes three magnetic pole portions arranged in parallel and spaced apart from each other by a predetermined spacing so that each of the two inductors is positioned within the spacing; and two yoke portions for magnetically coupling the three magnetic pole portions adjacent to one another. Each of the three magnetic pole portions has at least one opposed surface. Then, a permanent magnet row is arranged on the at least one opposed surface of each of the three magnetic pole portions. Each of the three armature windings for generating a magnetic flux is wound around each of the three magnetic pole portions. Then, a geometrical phase difference between two tooth rows provided at each of the two inductors in terms of electrical angle is 180 degrees. A geometrical phase difference between the two inductors in terms of electrical angle is zero degrees. A geometrical phase difference between two permanent magnet rows facing the two tooth rows provided at each of the two inductors in terms of electrical angle is 60 degrees. A geometrical phase difference between two permanent magnet rows provided at the magnetic pole portion located in the middle of the three magnetic pole portions in terms of electrical angle is zero degrees. A geometrical phase difference between two permanent magnet rows each provided at the magnetic pole portions located on each side of the three magnetic pole portions in terms of electrical angle is 30 degrees. The armature iron core is constituted by a plurality of electromagnetic steel plates laminated in the moving direction.

In this linear motor, the geometrical phase difference between the two tooth rows provided at each of the two inductors in terms of electrical angle is 180 degrees. Thus, the magnetic saturation of the magnetic pole portion located in the middle can be prevented. Since the geometrical phase difference between the two inductor in terms of electrical angle is zero degrees, the two inductors can be installed by aligning the tooth rows thereof to one another. Thus installation of the inductors is thereby facilitated.

In the magnetically coupled two inductors in this linear motor, magnetic coupling is achieved by coupling the lower portions of the two inductors using a coupling portion, for example. In this case, dimensions in a vertical direction of the magnetic pole portion in the middle are reduced so as to face the coupling portion with a space interposed therebetween. For this reason, the length of the two permanent magnet rows provided at the magnetic pole portion in the middle in the vertical direction (i.e. a direction orthogonal to the moving direction of an armature and the width direction of each of the inductors) becomes shorter than the length of the permanent magnet rows each provided at one of the two magnetic pole portions located on each side of the three magnetic pole portions in the above-mentioned directions.

Still other specific linear motor according to the present invention includes two inductors arranged in parallel and spaced apart from each other by a predetermined spacing in a width direction of each of the two inductors orthogonal to a moving direction of a moving element. Each of the two inductors includes a tooth row on each side thereof in the width direction. An armature iron core includes three magnetic pole portions arranged in parallel and spaced apart from each other by a predetermined spacing so that each of the two inductors is positioned within the spacing; and two yoke portions for magnetically coupling the three magnetic pole portions adjacent to one another. Each of the three magnetic pole portions has at least one opposed surface. A permanent magnet row is arranged on the at least one opposed surface of each of the three magnetic pole portions. Two armature windings each for generating a magnetic flux are respectively wound around two of the three magnetic pole portions that are located on both ends of the three magnetic pole portions or the two yoke portions for magnetically coupling the three magnetic pole portions. A geometrical phase difference between two tooth rows provided at the each of the two inductors, in terms of electrical angle is 90 degrees. A geometrical phase difference between two permanent magnet rows facing two tooth rows of each of the two inductors in terms of electrical angle is 90 degrees. The armature iron core is constituted by a plurality of electromagnetic steel plates laminated in the moving direction. In such a linear motor, the number of the armature windings can be reduced.

Preferably, a cooling tube is arranged in a winding state so that the cooling tube is adjacent to the armature windings. In the linear motor of the present invention, the number of the armature windings can be reduced. Thus, the number of bent portions of the cooling tube in the winding state can be reduced.

With the structure of this invention, the number of armature windings can be advantageously reduced. According to the linear motor of the present invention, a plurality of yoke portions are arranged side by side in the direction orthogonal to the moving direction of the moving element, or the width direction of each of the inductors. Each of the armature windings wound around the magnetic pole portions or the yoke portions, respectively, thus can be wound in the direction extending in the moving direction of the moving element. The armature windings can be arranged side by side in the direction orthogonal to the moving direction of the moving element or the width direction of each of the inductors. For this reason, by adjusting the size of each of the armature windings, the number of the armature windings can be reduced.

Further, the cross-sections of the armature iron core in the directions orthogonal to the moving direction of the moving element can be made to have an identical shape. Accordingly, the armature iron core can be constituted by a plurality of electromagnetic steel plates laminated in the moving direction of the moving element. For this reason, fitting members for fixing the armature iron core to the iron core supporting member such as the movable stage can be formed in the armature iron core.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF PREFERRED EMBODIMENTS

Figure 1:
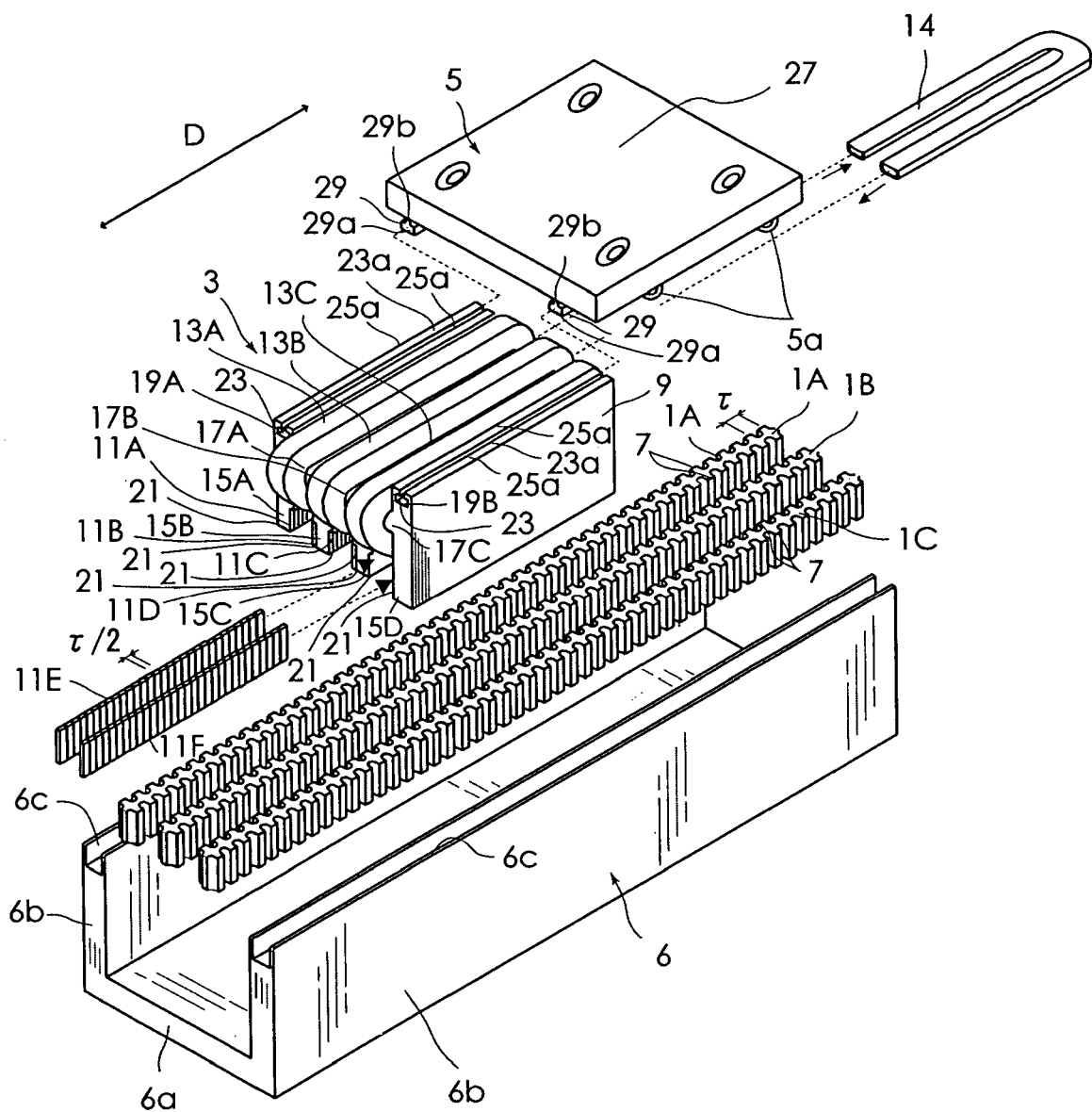
FIG. 1 is an exploded perspective view of a linear motor according to a first embodiment of the present invention.
Figure 2:
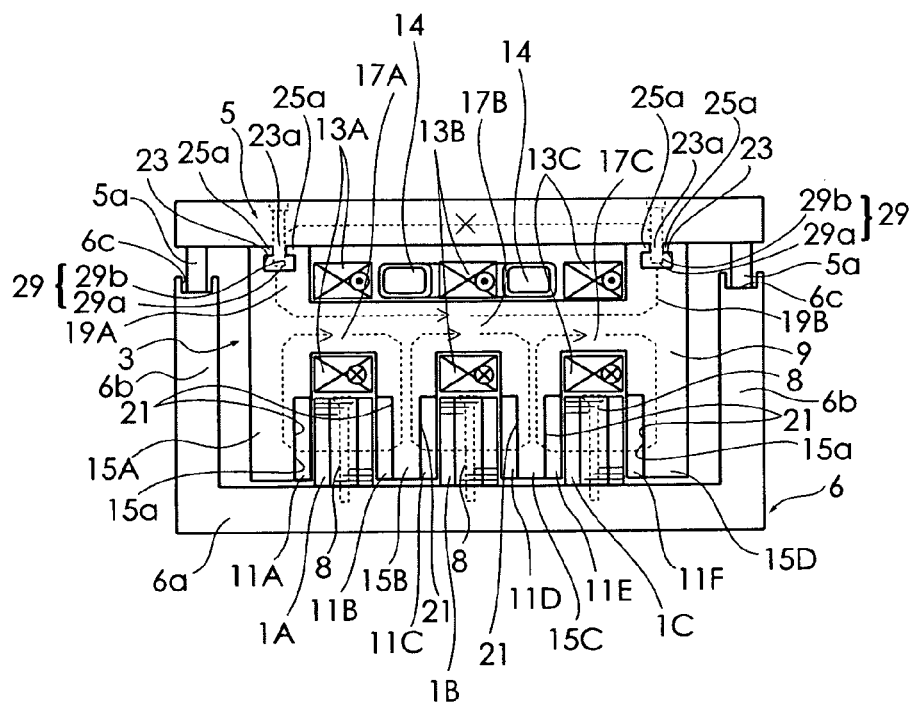
FIG. 2 is a schematic front view of the linear motor according to the first embodiment of the present invention.
Figure 3:
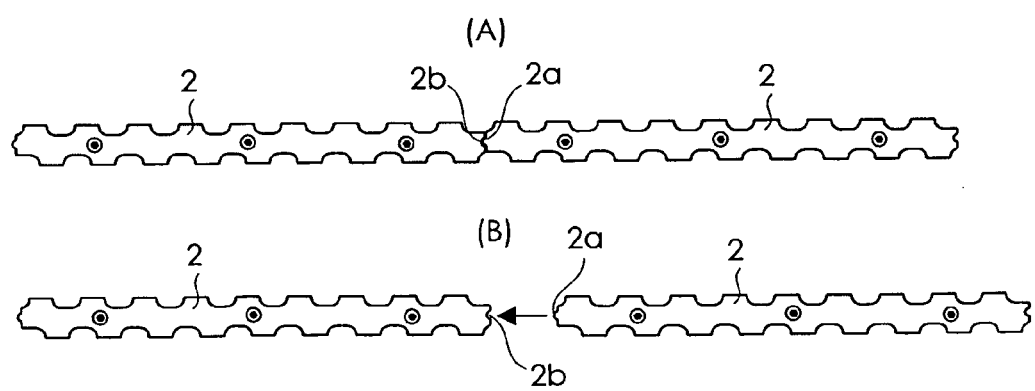
FIG. 3(A) is a plan view showing a state in which a plurality of inductor segments constituting each conductor used in the linear motor in the first embodiment of the present invention are coupled.
FIG. 3(B) is a plan view showing a state in which the inductor segments are separated.

A best mode for carrying out the present invention will be described with reference to drawings. FIG. 1 is an exploded perspective view of a linear motor according to a first embodiment of the present invention. FIG. 2 is a schematic front view of the linear motor. As shown in both of the drawings, the linear motor in this embodiment includes three inductors 1A to 1C that constitute a stator, an armature 3 constituting a moving element, an iron core support member (movable stage) 5, and a base frame 6. Each of the three inductors 1A to 1C includes two tooth rows 7 constituted by a plurality of teeth provided at a predetermined pitch τ in a direction of movement of the armature 3 (in the directions of arrows D), and is constituted by lamination of a plurality of steel plates formed of a magnetic material. Each of the three inductors 1A to 1C is arranged so that one of the two tooth rows 7 thereof is located on each side thereof in a width direction of each of the three inductors 1A to 1C (i.e a direction orthogonal to the moving direction of the armature 3). The three inductors 1A to 1C are arranged in parallel and spaced apart from each other by a predetermined spacing in the width direction. In this embodiment, each of the inductors 1A to 1C is constituted by combination of a plurality of inductor segments 2 in the moving direction of the armature 3, as shown in FIGS. 3(A) and 3(B). Specifically, a convex portion 2a formed at an end of one of adjacent inductor segments is fitted into a concave portion 2b formed at an end of the other of the adjacent inductor segments. The inductor segments 2 are thereby coupled. Then, the three inductors 1A to 1C are fixed to a base 6a of the base frame 6 by screws 8 (indicated by broken lines in FIG. 2).

The armature 3 includes an armature iron core 9, six permanent magnet rows 11A to 11F, and three armature windings 13A to 13C. The armature iron core 9 includes four magnetic pole portions 15A to 15D, three yoke portions 17A to 17C, and two rib portions 19A and 19B, and is constituted by a plurality of electromagnetic steel plates laminated in the moving direction of the armature 3. Each of the four magnetic pole portions 15A to 15D has a rectangular parallelopiped shape that extends in the moving direction of the armature 3. Then, the four magnetic pole portions 15A to 15D are arranged in parallel and spaced apart from each other by a predetermined spacing so that the inductor 1A is interposed between the magnetic pole portions 15A and 15B, the inductor 1B is interposed between the magnetic pole portions 15B and 15C, and the inductor 1C is interposed between the magnetic pole portions 15C and 15D. Each of the magnetic pole portions 15A to 15D has at least one opposed surface 21 facing the adjacent inductor 1A, 1B, or 1C. Each of the permanent magnet rows 11A to 11F is arranged on the opposed surface 21. In this embodiment, each of the permanent magnet rows 11A to 11F is arranged on the opposed surface 21 in a state in which the permanent magnet rows 11A to 11F are buried in the magnetic pole portions 15A to 15D, respectively, so that two external surfaces of each of the permanent magnet rows 11A to 11F are in contact with each of permanent magnet mounting portions 15a of the magnetic pole portions 15A to 15D and two surfaces are exposed outside. The state in which the inductors 1A to 1C face the permanent magnet rows 11A to 11F will be described later.

The three yoke portions 17A to 17C extend in the direction of movement of the armature 3 (in the direction of the arrows D), respectively, thereby magnetically coupling the adjacent two magnetic pole portions 15A and 15B, 15B and 15C, and 15C and 15D, respectively. Then, the three armature windings 13A to 13C for generating magnetic fluxes are wound around the yoke portions 17A to 17C, respectively. Specifically, the armature winding 13A of a U phase is wound around the yoke portion 17A, the armature winding 13B of a V phase is wound around the yoke portion 17B, and the armature winding 13C of a W phase is wound around the yoke portion 17C. For this reason, as shown in FIG. 2, a magnetic flux caused by the armature winding 13A of the U phase is flown between the magnetic pole portion 15B including the permanent magnet row 11B and the magnetic pole portion 15A including the permanent magnet row 11A. A magnetic flux caused by the armature winding 13B of the V phase is flown between the magnetic pole portion 15C including the permanent magnet row 11D and the magnetic pole portion 15B including the permanent magnet row 11C. A magnetic flux caused by the armature winding 13C of the W phase is flown between the magnetic pole portion 15D including the permanent magnet row 11F and the magnetic pole portion 15C including the permanent magnet row 11E. In a gap between the adjacent armature windings 13A and 13B, and in a gap between the adjacent armature windings 13B and 13C, a cooling tube 14 is arranged in a winding state so as to be adjacent to the armature windings 13A to 13C. In this embodiment, the cooling tube 14 has a shape that is bent along the armature windings 13A to 13C. Inside the cooling tube, a refrigerant for cooling the armature windings 13A to 13C is flown.

The two rib portions 19A and 19B are respectedly arranged above the magnetic pole portions 15A and 15D that are located at both ends of the armature iron core 9. A fitting concave portion 23 that extends in the moving direction of the armature 3 is formed in the upper portion of each of the two rib portions 19A and 19B. A pair of flat plate portions 25a is arranged in the upper portion of the fitting concave portion 23 so that a narrow opening 23a is formed in the middle of the fitting concave portion 23. With arrangement of this pair of flat plate portions 25a, the fitting concave portion 23 has a substantially rectangular cross-section.

The movable stage 5 that constitutes the iron core supporting member is fixed above the armature iron core 9 and includes a stage body 27 and pair of fitting convex portions 29. Each fitting concave portion 29 has a narrow rectangular parallelopiped concave body 29a that can be fitted into the fitting concave portion 23 and a coupling portion 29b that couples the stage body 27 to the concave body 29a and is arranged in the opening 23a. With this arrangement, just by moving the armature iron core 9 and the movable stage 5 relatively so that the concave bodies 29a are inserted into the fitting concave portions 23 and the coupling portions 29b are inserted into openings 23a, the armature iron core 9 can be readily fixed to the movable stage 5. As shown in FIG. 2, this movable stage 5 is slidably supported by a pair of sidewalls 6b of the base frame 6, arranged on both sides of the armature 3. In this embodiment, ring bodies 5a provided at the movable stage 5 are arranged within grooves 6c that are open in the upper portions of the sidewalls 6b.

Figure 4:
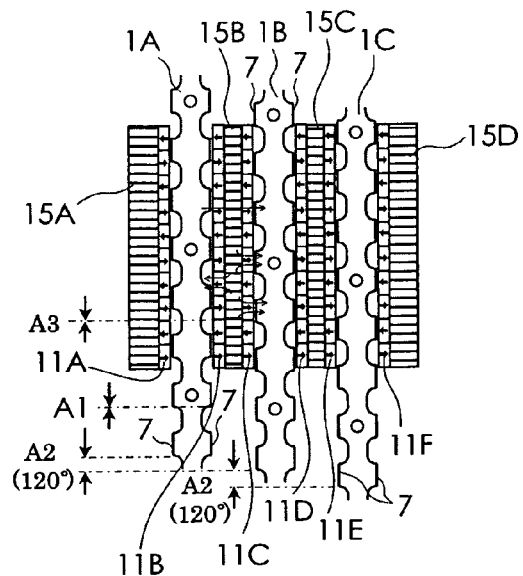
FIG. 4 is a sectional view of the linear motor in the first embodiment of the present invention.

As described before, each of the permanent magnet rows 11A to 11F is arranged on the opposed surface 21 of each of the magnetic pole portions 15A to 15D. Specifically, each of the permanent magnet rows 11A, 11B is arranged on each of the opposed surfaces 21 of the magnetic pole portions 15A, 15B. Each of the permanent magnet rows 11C, 11D is arranged on each of the opposed surfaces 21 of the magnetic pole portions 15B, 15C. Each of the permanent magnet rows 11E, 11F is arranged on each of the opposed surfaces 21 of each of the magnetic pole portion 15C, 15D. Each of the permanent magnet rows 11A to 11F is so arranged that different polarities alternately appear along the opposed surface 21 in the moving direction of the armature 3 at a pitch τ/2, which is half the pitch τ of a plurality of teeth in each of the tooth rows 7. In this embodiment, as shown in FIG. 4, a geometrical phase difference A1 between the two tooth rows 7 of each of the three inductors 1A to 1C in terms of electrical angle is zero degrees. A geometrical phase difference A2 among the three inductors 1A to 1C in terms of electrical angle is 120 degrees. A geometrical phase difference A3 between two magnet rows (11A,11B) (11C, 11D) (11E,11F) facing the two tooth row 7 of each of the inductors 1A to 1C in terms of electrical angle is zero degrees.

In FIG. 4, magnetizing directions of permanent magnet rows 11A to 11F are indicated by arrows within the permanent magnet rows 11A to 11F. In the linear motor in this embodiment, the magnetic fluxes caused by the armature windings 13A to 13B are changed by a flow converged by a plurality of magnets in the permanent magnet rows 11A to 11F, thereby generating a force of attraction between predetermined magnets and a plurality of teeth of the tooth rows 7 of the inductors 1A to 1C. Then, by changing the magnetic fluxes caused by the armature windings 13A to 13B, thrust force against the inductors 1A to 1C constituting the stator is generated in the armature 3 that constitutes the moving element.

According to the linear motor in this embodiment, the three yoke portions 17A to 17C are arranged side by side in the direction orthogonal to the moving direction of the armature 3 (which is the width direction of each of the inductors 1A to 1C). Thus, each of the three armature windings 13A to 13B wound around the three yoke portions 17A to 17C, respectively, can be wound in a direction extending in the moving direction of the armature 3. Then, the three armature windings 13A to 13B can be arranged side by side in the direction orthogonal to the moving direction of the armature 3, or in the width direction of each of the inductors 1A to 1C. For this reason, by adjusting the size of each armature winding, the number of the armature windings 13A to 13B can be reduced to three. Further, the cross-sections of the armature iron core 9 in the directions orthogonal to the moving direction of the armature 3 can be made to have an identical shape. Accordingly, the armature iron core 9 can be constituted by a plurality of electromagnetic steel plates laminated in the moving direction of the armature 3. For this reason, fitting members for fixing the armature iron core 9 to the movable stage 5 or the fitting concave portions 23 can be formed in the armature iron core 9. The geometrical phase difference A2 among the three inductors 1A to 1C in terms of electrical angle is 120 degrees. Thus, magnetic saturation of the armature iron core 9 can be made difficult to occur.

Figure 5:
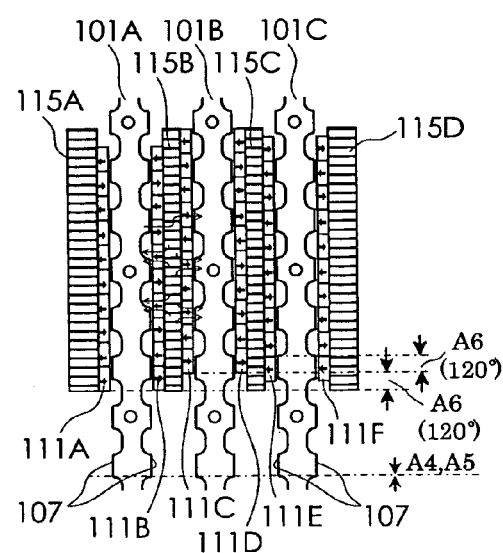
FIG. 5 is a sectional view of a linear motor according to a second embodiment of the present invention.

The inductors and the permanent magnet rows can be configured according to various aspects. FIG. 5 is a sectional view of a linear motor according to a second embodiment of the present invention. In the linear motor in this embodiment, a geometrical phase difference A4 between two tooth rows 107 provided at each of the three inductors 101A to 101C, respectively in terms of electrical angle is zero degrees. A geometrical phase difference A5 among the three inductors 101A to 101C in terms of electrical angle is zero degrees. A geometrical phase difference A6 between two permanent magnet rows (such as permanent magnet rows 111A and 111B) provided corresponding to one of the three inductors (such as the inductor 101A) and two permanent magnet rows (such as the permanent magnet row 111B and a permanent magnet row 111C) provided corresponding to the other one of the three inductors (such as the inductor 101B) adjacent to the one inductor (such as the inductor 101A) in terms of electrical angle is 120 degrees. In the linear motor in this embodiment, the magnetic saturation of an armature iron core 109 tends to occur. However the inductors 101A to 101C can be installed with the tooth rows 107 thereof aligned to one another. Installation of the inductors 101A to 101C is thereby facilitated.

Figure 6:
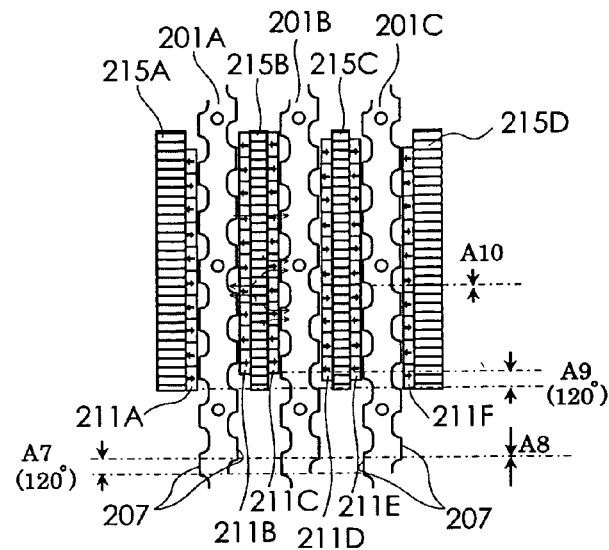
FIG. 6 is a sectional view of a linear motor according to a third embodiment of the present invention.

FIG. 6 is a sectional view of a linear motor according to a third embodiment of the present invention. In the linear motor in this embodiment, a geometrical phase difference A7 between two tooth rows 207 provided at each of three inductors 201A to 201C in terms of electrical angle is 120 degrees. A geometrical phase difference A8 among the three inductors 201A to 201C in terms of electrical angle is zero degrees. A geometrical phase difference A9 between two permanent magnet rows (such as permanent magnet rows 211A and 211B) facing the two tooth rows 207 of one inductor (such as the inductor 201A) in terms of electrical angle is 120 degrees. A geometrical phase difference A10 between two permanent magnet rows (such as permanent magnet rows 211D and 211E) provided at one magnetic pole portion (such as a magnetic pole portion 215C) in terms of electrical angle is zero degrees. In the linear motor in this embodiment, the geometrical phase difference A8 among the three inductors 201A to 201C in terms of electrical angle is zero degrees. Thus, the inductors 201A to 201C can be installed by aligning the tooth rows 207 thereof to one another. For this reason, installation of the inductors 201A to 201C is facilitated. Further, the magnetic saturation of an armature iron core 209 can be made difficult to occur.

Figure 7:
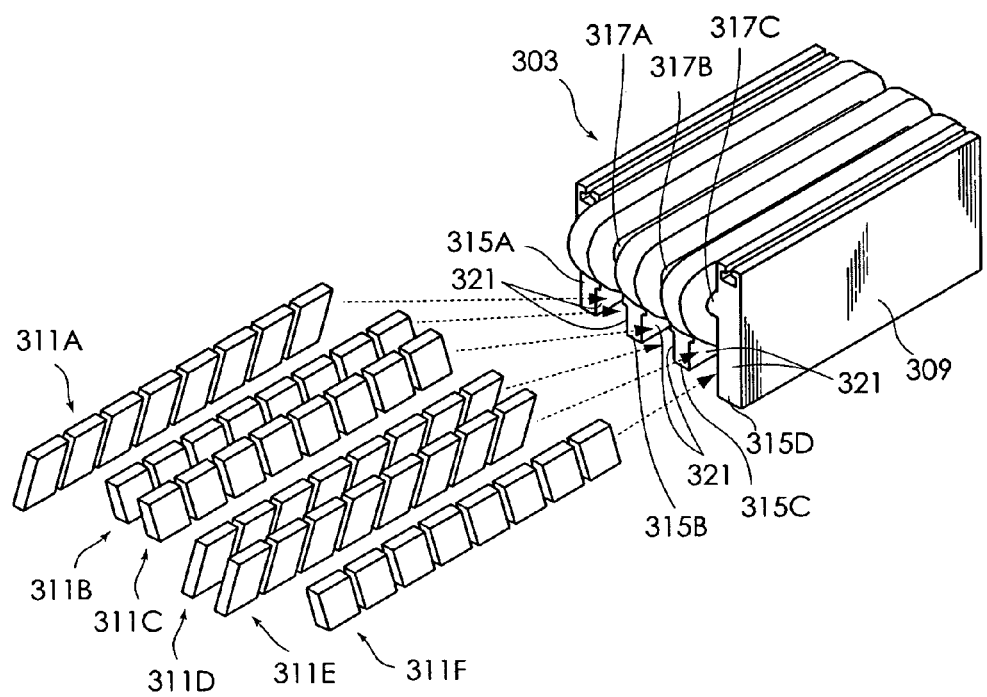
FIG. 7 is a perspective view of an armature used in a linear motor according to a fourth embodiment of the present invention.

FIG. 7 is a perspective view of an armature 303 used in a linear motor according to a fourth embodiment of the present invention. The linear motor in this embodiment has the same structure as that of the linear motor according to the first embodiment shown in FIG. 1 except for the configurations of an armature iron core 309 and permanent magnet rows 311A to 311F mounted on the armature iron core 309. In the linear motor in this embodiment, a plurality of permanent magnets constituting each of the permanent magnet rows 311A to 311F is skewed with respect to the teeth constituting one of the inductor tooth rows facing the permanent magnets. Then, the permanent magnets constituting each of the two permanent magnet rows provided at one magnetic pole portion are skewed in the same direction. In the linear motor in this embodiment, the permanent magnets are skewed. Thus, a cogging force generated in each phase becomes close to a sine wave, so that the sum of cogging forces in respective phases are canceled out, and reduced.

Figure 8:
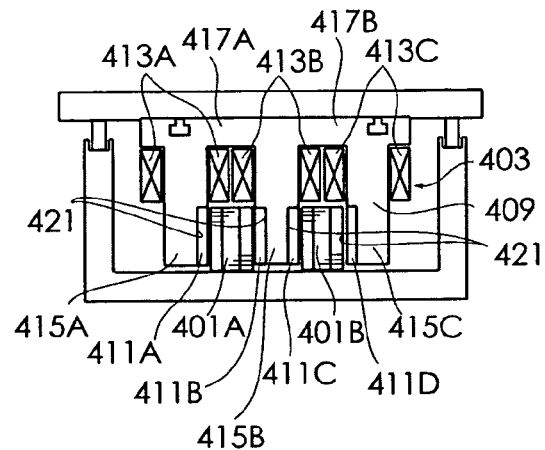
FIG. 8 is a front view of a linear motor according to a fifth embodiment of the present invention.
Figure 9:
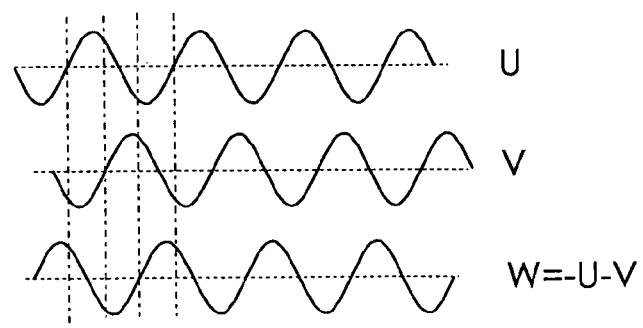
FIG. 9 is a graph showing phases of armature windings of the linear motor in the fifth embodiment of the present invention.
Figure 10:
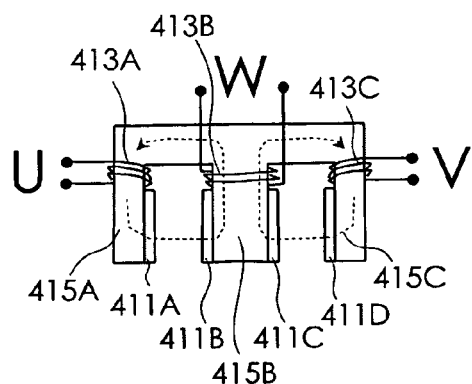
FIG. 10 is a schematic diagram for explaining flows of magnetic fluxes in the linear motor in the fifth embodiment of the present invention.
Figure 11:
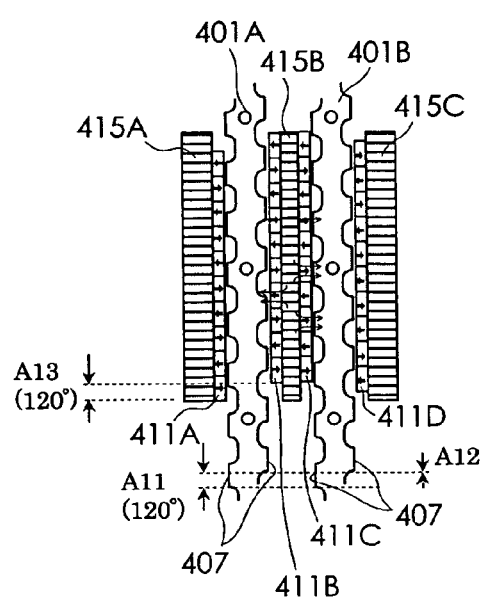
FIG. 11 is a sectional view of the linear motor in the fifth embodiment of the present invention.

FIG. 8 is a front view of a linear motor according to a fifth embodiment of the present invention. In the linear motor in this embodiment, two inductors 401A and 401B constitute a stator. Then, an armature 403 includes an armature iron core 409, four permanent magnet rows 411A to 411D, and three armature windings 413A to 413C. The armature iron core 409 includes three magnetic pole portions 415A to 415C, and two yoke potions 417A and 417B. The armature iron core 409 is constituted by a plurality of electromagnetic steel plates laminated in the moving direction of the armature 403. The three magnetic pole portions 415A to 415C are arranged in parallel and spaced apart from each other by a predetermined spacing so that the inductor 401A is interposed between the magnetic pole portions 415A and 415B, and the inductor 401B is interposed between the magnetic pole portions 415B and 415C. Each of the magnetic pole portions has at least one opposed surface 421 facing the adjacent inductor 401A or 401B. Each of the four permanent magnet rows 411A to 411D is arranged on the opposed surface 421. Specifically, each of the permanent magnet rows 411A, 411B is arranged on each of the opposed surfaces 421 of each of the magnetic pole portions 415A, 415B. Each of the permanent magnet rows 411C, 411D is arranged on each of the opposed surfaces 421 of the magnetic pole portions 415B, 415C. In the linear motor in this embodiment, three armature windings 413A to 413C for generating magnetic fluxes are wound around the upper portions of the three magnetic pole portions 415A to 415C, respectively. Specifically, the armature winding 413A of the U phase is wound around the magnetic pole portion 415A, the armature winding 413B of the W phase is wound around the magnetic pole portion 415B, and the armature winding 413C of the V phase is wound around the magnetic pole portion 415C. As described above, the windings of the three phases are employed as the armature windings 413A to 413C for the armature 403. As shown in FIG. 9, the armature winding 413B of the W phase has the phase inverse to the phase obtained by adding the phase of the armature winding 413A of the U phase and the phase of the armature winding 413B of the V phase. For this reason, as shown in a schematic diagram in FIG. 10, between the magnetic pole portion 415A including the permanent magnet row 411A and the magnetic pole portion 415B including the permanent magnet row 411B, a magnetic flux caused by the armature winding 413 of the U phase and the armature winding 413B of the W phase flows. Between the magnetic pole portion 415B including the permanent magnet row 411C and the magnetic pole portion 415C including the permanent magnet row 411D, a magnetic flux caused by the armature winding 413B of the W phase and the armature winding 413C of the V phase is flown. As a whole, the magnetic fluxes of a two-phase magnetic circuit are flown. In this embodiment, as shown in FIG. 11, a geometrical phase difference A11 between the two tooth rows 407 of each of the inductors 401A and 401B in terms of electrical angle is 120 degrees. A geometrical phase difference A12 between the two inductors 401A and 401B in terms of electrical angle is 0 degrees. A geometrical phase difference A13 between the two permanent magnet rows (such as the permanent magnet rows 411A and 411B) facing the two tooth rows 407 of one inductor (such as the inductor 401A) in terms of electrical angle is 120 degrees.

In the linear motor in this embodiment, the two-phase magnetic circuit are employed, However the armature windings are three phases are employed. For this reason, besides achieving downsizing of the linear motor, a driving force as a three-phase motor can be obtained. Further, since the geometrical phase difference A11 between the two tooth rows 407 in terms of electrical angle is 120 degrees, the magnetic saturation of the magnetic pole portion 415B in the middle of the magnetic pole portions can be prevented.

Further, the geometrical phase difference A12 between the two inductors 401A and 401B in terms of electrical angle is zero degrees. Thus, the inductors 401A and 401B can be installed by aligning the tooth rows 407 to one another. Installation of the inductors 401A and 401B is thus facilitated.

Figure 12:
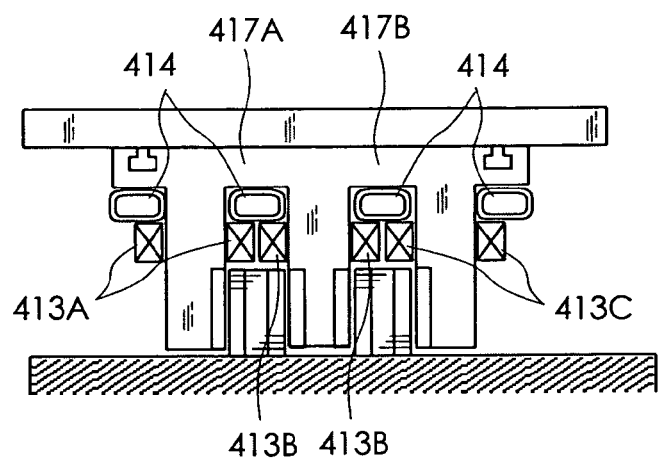
FIG. 12 is a front view of the linear motor in the fifth embodiment having a cooling tube arranged therein.
Figure 13:
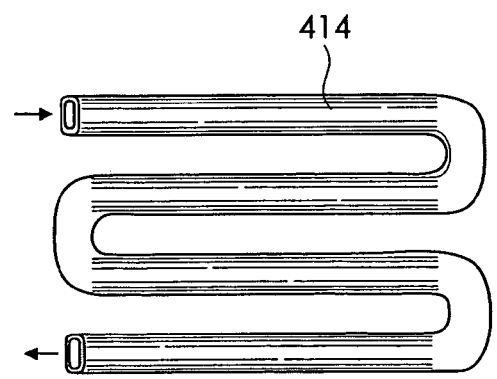
FIG. 13 is a perspective view of the cooling tube used in the linear motor in the fifth embodiment.

FIG. 12 shows an example in which a cooling tube 414 is arranged in the linear motor according to the fifth embodiment shown in FIG. 8. In this embodiment, the armature windings 413A to 413C are constituted so that gaps are formed between the respective yoke portions 417A and 417B and the respective armature windings 413A to 413C. Then, the cooling tube 414 is arranged in these spaces in a winding state so as to be adjacent to the armature windings 413A to 413C. In this embodiment, as shown in FIG. 13, the cooling tube 414 has a shape that is bent along the armature windings 413A to 413C, and inside the cooling tube 414, a coolant for cooling the armature windings 413A to 413C flows.

Figure 14:
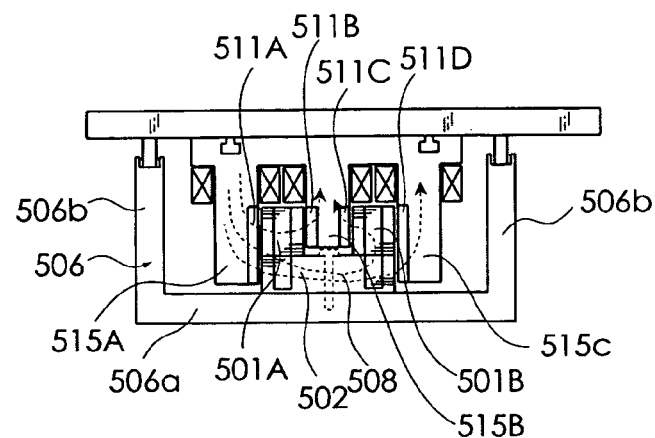
FIG. 14 is a front view of a linear motor according to a sixth embodiment of the present invention.
Figure 15:
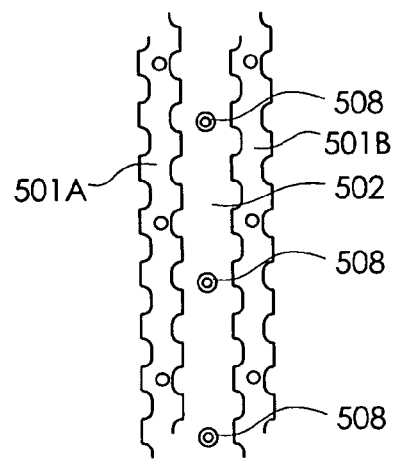
FIG. 15 is a partial front view of inductors of the linear motor in the sixth embodiment of the present invention.

FIG. 14 is a front view of a linear motor according to a sixth embodiment of the present invention. The linear motor in this embodiment has the same structure as the linear motor in the fifth embodiment shown in FIG. 8, except the structures of inductors, a magnetic pole portion that is located in the middle of three magnetic pole portions, and permanent magnet rows. In the linear motor in this embodiment, two inductors 501A and 501B are magnetically coupled. Specifically, as shown in FIGS. 14 and 15, the lower portions of the inductors 501A and 501B are coupled by a coupling portion 502. The coupling portion 502 is fixed to a base 506a of a base frame 506 by screws 508. Dimensions in a vertical direction of a magnetic pole portion 515B that is located in the middle of the three magnetic pole portions are reduced so as to face the coupling portion 502 with a space interposed therebetween. For this reason, the length of two permanent magnet rows 511B and 511C in a direction orthogonal to a moving direction of an armature 503 and a width direction of each of the inductors 501A and 501B becomes shorter than the length of permanent magnet rows 511A and 511D in the above-mentioned direction. The two permanent magnet rows 511B and 511C are provided at the magnetic pole portion 515B that is located in the middle, while the permanent magnet rows 511A and 511D are provided at two magnetic pole portions 515A and 515C, each of which is located on each of the both sides of the three magnetic pole portions 515A to 515C.

Figure 16:
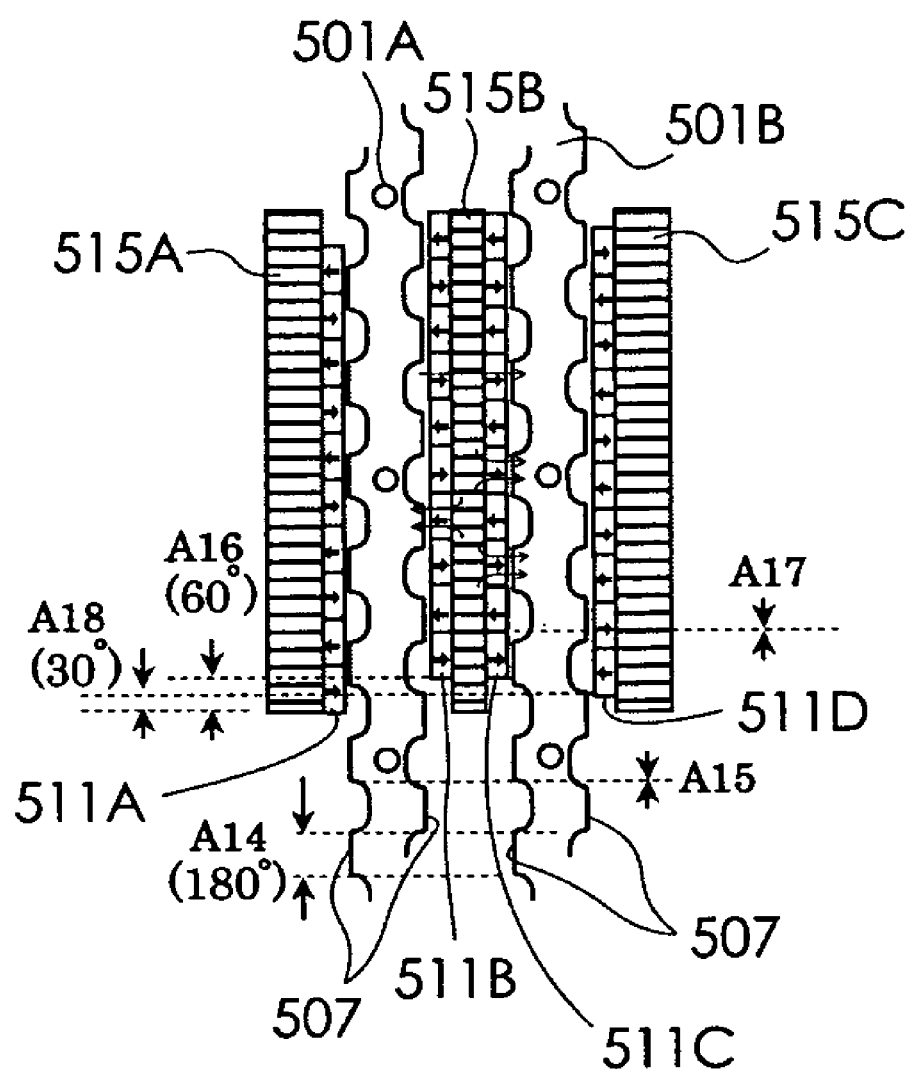
FIG. 16 is a sectional view of the linear motor in the sixth embodiment of the present invention.

In this embodiment, as shown in FIG. 16, a geometrical phase difference A14 between two tooth rows of each of the two inductors 501A and 501B in terms of electrical angle is 180 degrees. A geometrical phase difference A15 between the two inductors 501A and 501B in terms of electrical angle is zero degrees. A geometrical phase difference A16 between the two permanent magnet rows (such as the permanent magnet rows 511A and 511B) facing the two tooth rows of one inductor such as the inductor 501A in terms of electrical angle is 60 degrees. A geometrical phase difference A17 between the permanent magnet rows 511B and 511C provided at the magnetic pole portion 515B located in the middle of the three magnetic pole portions in terms of electrical angle is zero degrees. A geometrical phase difference A18 between the permanent magnet row 511A of the magnetic pole portion 515A and the permanent magnet row 511D of the magnetic pole portion 515C in terms of electrical angle is 30 degrees. The two magnetic pole portions 515A and 515C are each located on each of the both sides of the three magnetic pole portions.

In the linear motor in this embodiment, the geometrical phase difference A14 between two tooth rows 507 in terms of electrical angle is 180 degrees. Thus, the magnetic saturation of the magnetic pole portion 515B that is located in the middle of the three magnetic pole portions can be prevented. Further, since the geometrical phase difference A15 between the two inductors 501A and 501B in terms of electrical angle is 0 degrees, the inductors 501A and 501B can be installed by aligning the tooth rows 507 to one another. Installation of the inductors 501A and 501B is thus facilitated.

Figure 17:
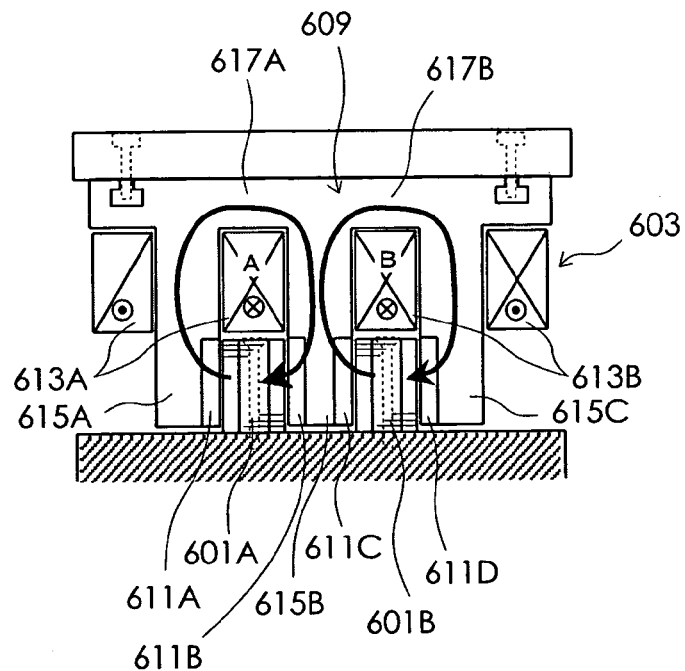
FIG. 17 is a front view of a linear motor according to a seventh embodiment of the present invention.
Figure 18:
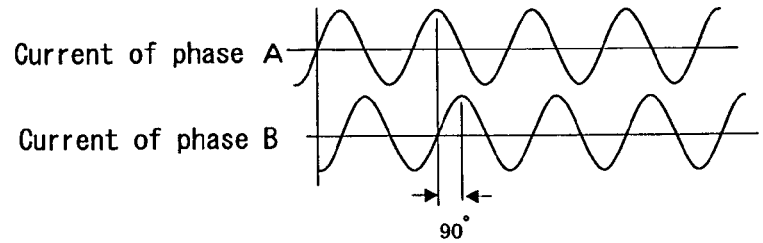
FIG. 18 is a graph showing phases of armature windings of the linear motor in the seventh embodiment of the present invention.
Figure 19:
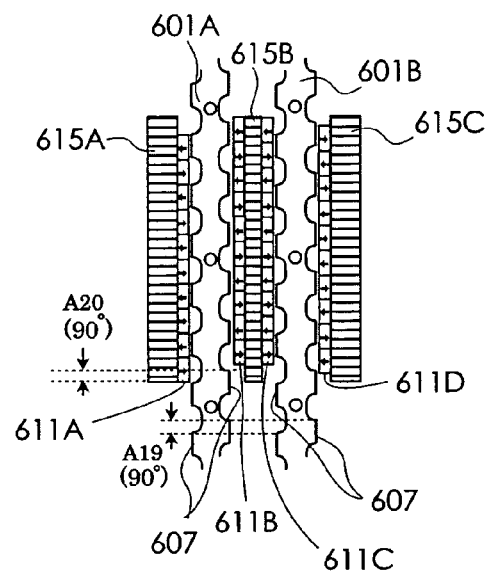
FIG. 19 is a sectional view of the linear motor in the seventh embodiment of the present invention.

FIG. 17 is a front view of a linear motor according to a seventh embodiment of the present invention. In the linear motor in this embodiment, a stator is constituted by two inductors 601A and 601B. Then, an armature 603 includes an armature iron core 609, four permanent magnet rows 611A to 611D, and two armature windings 613A and 613B. The armature iron core 609 includes three magnetic pole portions 615A to 615C and two yoke portions 617A and 617B. The armature iron core 609 is constituted by a plurality of electromagnetic steel plates laminated in a moving direction of the armature 603. The three magnetic pole portions 615A to 615C are arranged in parallel and spaced apart from each other by a predetermined spacing so that the inductor 601A is interposed between the magnetic pole portions 615A and 615B and the inductor 601B is interposed between the magnetic pole portions 615B and 615C. The four permanent magnet rows 611A to 611D are arranged on opposed surfaces of the respective magnetic pole portions facing the inductors 601A and 601B, respectively. Specifically, each of the permanent magnet rows 611A, 611B is arranged on each of the opposed surfaces of the magnetic pole portions 615A, 615B facing the inductor 601A. Each of the permanent magnet row 611C is arranged on the opposed surface of the magnetic pole portion 615B facing the inductor 601B. The permanent magnet row 611D is arranged on the opposed surface of the magnetic pole portion 615C facing the inductor 601B. In the linear motor in this embodiment, the two armature windings 613A and 613B are respectively wound around the upper portions of the two magnetic pole portions 615A and 615C located on each of the both ends of the three magnetic pole portions 615A to 615C. Specifically, the armature winding 613A of an A phase is wound around the magnetic pole portion 615A, and the armature winding 613B of a B phase is wound around the magnetic pole portion 615C. As shown in FIG. 18, the A phase is shifted from the B phase by 90 degrees. As shown in arrows in FIG. 17, between the magnetic pole portion 615A including the permanent magnet row 611A and the magnetic pole portion 615B including the permanent magnet row 611B, a magnetic flux caused by the armature winding 613A of the A phase flows. Between the magnetic pole portion 615B including the permanent magnet row 611C and the magnetic pole portion 615C including the permanent magnet row 611D, a magnetic flux caused by the armature winding 613B of the B phase flows. In this embodiment, as shown in FIG. 19, a geometrical phase difference A19 between two tooth rows 607 of each of the two inductors 601A and 601B in terms of electrical angle is 90 degrees. A geometrical phase difference A20 between the two permanent magnet rows such as the two permanent magnet rows 611A and 611B facing the two tooth rows 607 of one inductor such as the inductor 601A in terms of electrical angle is 90 degrees.

Figure 20:
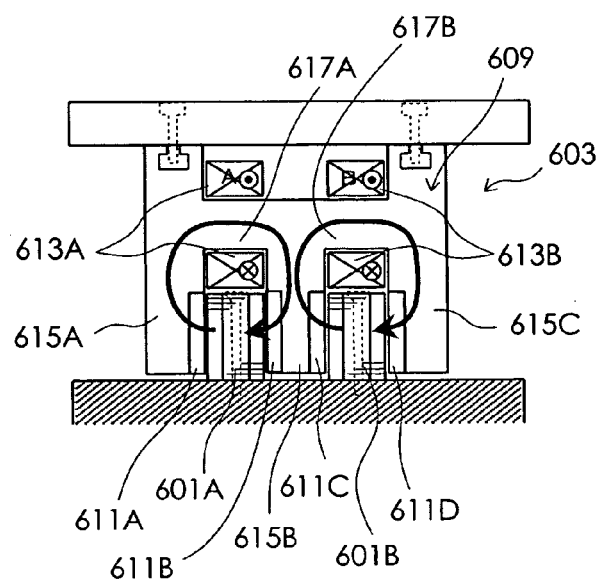
FIG. 20 is a front view of a linear motor according to an eighth embodiment of the present invention.

FIG. 20 is a front view of a linear motor according to an eighth embodiment of the present invention. The linear motor in this embodiment has the same structure as the linear motor in the seventh embodiment except that the two armature windings 613A and 613B are respectively wound around the two yoke portions 617A and 617B that magnetically couples the three magnetic pole portions 615A to 615C.

In the linear motors in the seventh and eighth embodiments, the number of armature windings can be reduced.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A linear motor having a moving element and a stator comprising:

at least two inductors formed of a magnetic material; each of said at least two inductors including a tooth row at each of both sides in a width direction orthogonal to a moving direction of said moving element, said tooth row being formed of a plurality of teeth provided at predetermined pitch $\tau_1$ in said moving direction, said at least two inductors being arranged in parallel and spaced apart from each other by a predetermined spacing in said width direction orthogonal to said moving direction, an armature having an armature iron core, at least two armature windings, and at least four permanent magnet rows including a plurality of permanent magnets being provided at a predetermined pitch $\tau_2$ in said moving direction, said permanent magnets being so arranged that different polarities alternately appear in said moving direction; said armature iron core including at least three magnetic pole portions and at least two yoke portions each for magnetically coupling adjacent two of said at least three magnetic pole portions, said at least three magnetic pole portions being spaced apart from each other in parallel by a predetermined spacing so that each of said inductors is positioned within the spacing, wherein each of said at least three magnetic pole portions has one or two opposed surfaces opposing said tooth row of each of said inductors, and each of the at least four permanent magnet rows is provided on each of said opposed surfaces, said at least two armature windings are wound around said at least three magnetic pole portions or said at least two yoke portions so that magnetic flux is generated between said plurality of permanent magnets forming said permanent magnetic pole row and said tooth row opposing said permanent magnet pole row, either of said at least two inductors or said armature is used as said moving element and other of said at least two inductors or said armature is used as said stator.

2. The linear motor according to claim 1, wherein said armature iron core is constituted by a plurality of electromagnetic steel plates laminated in said moving direction.

3. The linear motor according to claim 2, wherein said armature iron core is fixed to an iron core supporting member for moving relative to the at least two inductors;

one of fitting concave portions and fitting convex portions are formed in said armature iron core, and the other of said fitting concave portions and said fitting convex portions are formed in said iron core supporting member; and the one of said fitting concave portions and said fitting convex portions are fitted into the other of said fitting concave portions and said fitting convex portions, thereby fixing said armature iron core to said iron core supporting member.

4. The linear motor according to claim 1, wherein the pitch $\tau_2$ is half of the pitch $\tau_1$.

5. The linear motor according to claim 1, wherein the permanent magnets constituting said permanent magnet row facing said tooth row are skewed with respect to the teeth constituting tooth row.

6. The linear motor according to claim 5, wherein the permanent magnets constituting said two permanent magnet rows provided at said magnetic pole portion are skewed in the same direction.

7. The linear motor according to claim 1, wherein at least one permanent magnet mounting portion is formed on each of said three or more magnetic pole portions, said at least one permanent magnet mounting portion being so configured as to come into contact with at least two external surfaces of each of said permanent magnets.

* * * * *